C. T. ROGERS.
COASTING SLED.
APPLICATION FILED SEPT. 6, 1910.
993,622.
Patented May 30, 1911.
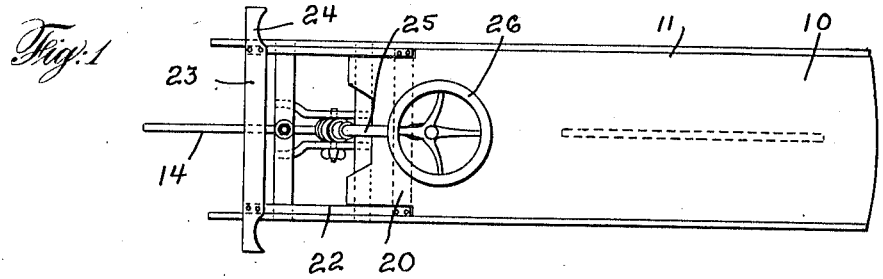
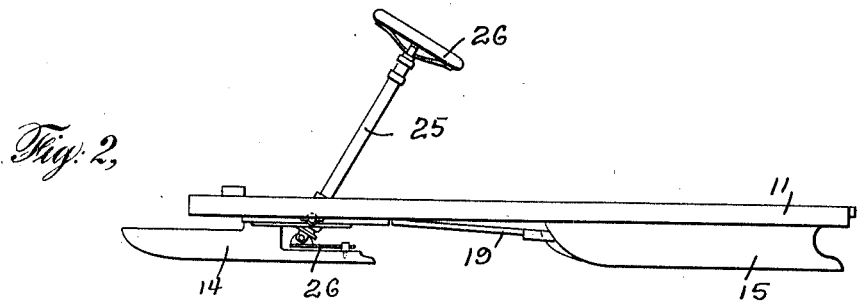
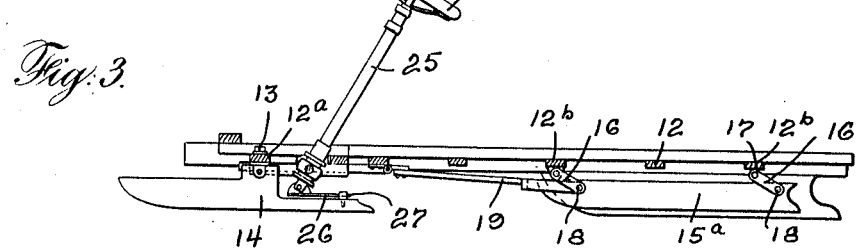
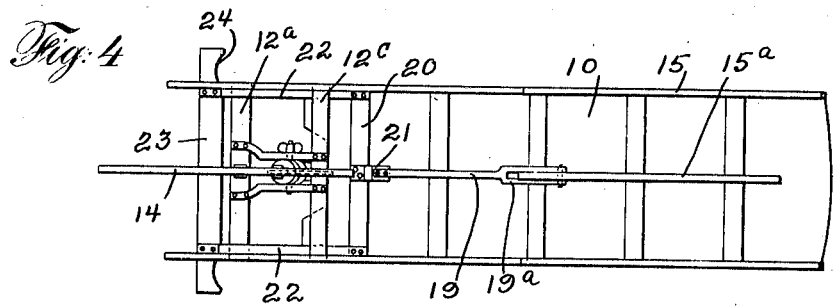
Witnesses:
Clarence T. Rogers, Inventor,
By his Attorney.

UNITED STATES PATENT OFFICE.

CLARENCE T. ROGERS, OF NEW YORK, N. Y.

COASTING-SLED.

993,622. Specification of Letters Patent. Patented May 30, 1911.

Application filed September 6, 1910. Serial No. 580,782.

*To all whom it may concern:*

Be it known that I, CLARENCE T. ROGERS, of the city, county, and State of New York, have invented a new and useful Improvement in Coasting-Sleds, of which the following is a full, clear, and exact description.

My invention relates to improvements in sleds, and the object of my invention is to produce a simple sled which can be easily controlled and steered, and which will be very much faster than the sleds generally used.

Usually coasting sleds are provided with two parallel runners, and consequently have considerable friction on the snow or ice, but in my invention I use two runners after the sled has attained sufficient velocity, and instead of placing these side by side, I employ short runners which aline longitudinally under the center of the sled, the rear one being arranged so that it can be raised and lowered in relation to the top of the sled, and the forward one swiveling easily and serving as a steering runner. These runners alining as they do, have very little friction, and the sled runs rapidly and easily over the snow or ice. I find that I get the same advantage that a bicycle has over a four wheeled vehicle, and on the same principle I find that when the sled is in motion it is easily balanced and controlled. In order to prevent the sled from tipping when it is going slowly, and to enable it to be easily drawn up hill, I provide two side runners which will touch the ground when the center runner is raised up out of contact with the ground.

The object of my invention is to produce a sled which may ordinarily run upon three runners, but which when sufficient velocity is attained, a fourth runner may be instantly thrown down and thus enable the sled to run upon two alining runners.

Reference is to be had to the accompanying drawings forming a part of this specification, in which similar reference characters indicate corresponding parts in all the views.

Figure 1 is a top view of the sled. Fig. 2 is a side elevation of the same. Fig. 3 is a longitudinal cross section of the sled embodying my invention, and Fig. 4 is a bottom view of the sled.

The sled can be of any usual form, though I prefer to maintain generally the style of low flat construction. It has a top 10 and side frames 11, and is provided with the usual cross braces 12, $12^a$ and $12^b$, as in an ordinary sled. A king bolt or pivot 13 extends through the center of the cross bar $12^a$ and is rigidly connected with the runner 14. The sled has two side runners 15 rigidly secured to the side frames 11 near the back part of the sled. Midway between the runners 15 and parallel therewith, I provide a fourth runner $15^a$. This runner $15^a$ is connected at either end to the cross braces $12^b$ by links 16. The links 16 are preferably in pairs and are pivotally secured at 17 to the lower surface of the braces $12^b$ and to the runner 15 by bolts 18.

Connected to the front end of the runner $15^a$ is a rod 19 having a bifurcated end $19^a$ as shown in Fig. 4. The other end of the rod 19 is connected to a cross bar 20 by a hinge 21. The cross bar 20 is not connected to the sides of the sled, but is movable in relation thereto and is rigidly connected at each end to rods 22 which extend forward along the sides of the sled above the cross bar $12^c$ and under the cross bar $12^d$, and are rigidly connected at their outer ends to the movable bar 23 which extends beyond the sides of the sled to form foot rests 24. The runner $15^a$ is not as high as the runners 15, and when in the position shown in Fig. 3 its lower edge is above the plane of the lower edges of the runners 15 and it will not touch the ground. When, however, the bar 23 is pushed forward it will carry with it the rods 22 and the bar 20, which in turn by means of the rod 19 will pull the runner $15^a$ forward and downward so that the bottom of the runner $15^a$ will then be below the bottom of the runners 15. It will be understood that other suitable manual or pedal mechanism can be substituted for throwing the runner $15^a$ into and out of operation without affecting the principle of the invention.

Any suitable means may be provided for steering the sled by turning the front runner 14. I have shown in the drawings a post 25 having at its outer end a steering wheel 26. This post is rotatably supported on the frame of the sled, and at its lower end is pivotally secured to the rod 26 which in turn is secured to the rear part of the runner 14 at 27, so that when the post 25 is turned, the rod 26 will turn the runner 14 to the right or left as the case may be.

From the foregoing description it will be seen that I have produced a sled which is of low, flat construction, and one in which the operator can at will change from a sled running upon three runners to one running upon two alining runners. It is apparent that it will require a little skill to maintain the balance to operate the sled successfully, just as it requires a certain amount of skill to ride a bicycle, but when the sled is under way it easily balances and runs smoothly and without undue friction so that great speed is attained.

I claim:—

1. A coasting sled comprising a frame, and two alining runners secured to the frame, one of the runners being turnable and the other movable up and down in relation to the frame.

2. A coasting sled comprising a frame, longitudinally alining runners secured to the frame and equally distant from the sides thereof, auxiliary side runners rigidly secured to the frame near the rear part thereof, and means for lowering and raising one of the alining runners in relation to the side runners.

3. A coasting sled comprising a frame, two side runners rigidly secured to the frame, a third runner supported between the two side runners, and means for lowering and raising the third runner in relation to the side runner.

4. A coasting sled comprising a frame, a runner secured to the frame and turnable in relation thereto, two side runners rigidly secured to the frame, and a fourth runner supported on the frame between the side runners and movable up and down in relation thereto.

CLARENCE T. ROGERS.

Witnesses:
THOMAS T. SEELYE,
ARTHUR G. DANNELL.